United States Patent [19]
Nishimura et al.

[11] Patent Number: 5,912,057
[45] Date of Patent: Jun. 15, 1999

[54] CLADDING METHOD BY A LASER BEAM

[75] Inventors: Kimio Nishimura; Hidenobu Matsuyama, both of Kanagawa-ken, Japan

[73] Assignee: Nissan Motor Co,. Ltd., Kanagawa-ken, Japan

[21] Appl. No.: 08/896,835

[22] Filed: Jul. 18, 1997

[30] Foreign Application Priority Data

Jul. 19, 1996 [JP] Japan .................................. 8-191054

[51] Int. Cl.$^6$ .................................................. C23C 24/00
[52] U.S. Cl. .......................... 427/597; 427/554; 427/556
[58] Field of Search .................................. 427/596, 597, 427/554, 555, 556, 191, 192

[56] References Cited

U.S. PATENT DOCUMENTS

| | | | |
|---|---|---|---|
| 4,269,868 | 5/1981 | Livsey | 427/53.1 |
| 4,300,474 | 11/1981 | Livsey | 118/641 |
| 4,644,127 | 2/1987 | La Rocca | 219/121 |
| 4,730,093 | 3/1988 | Mehta et al. | 219/121 |
| 4,743,733 | 5/1988 | Mehta et al. | 219/121 |
| 4,832,993 | 5/1989 | Coulon | 427/53.1 |
| 5,038,014 | 8/1991 | Pratt et al. | 219/121.64 |
| 5,372,861 | 12/1994 | Kerrand et al. | 427/596 |
| 5,580,472 | 12/1996 | Maybon | 219/121.66 |
| 5,620,552 | 4/1997 | Denney | 156/272.2 |

*Primary Examiner*—Shrive Beck
*Assistant Examiner*—Paul D. Strain
*Attorney, Agent, or Firm*—McDermott, Will & Emery

[57] ABSTRACT

In a cladding method for covering a surface of a base metal with a metal for coating by using a processing apparatus for supplying a levigated coating metal together with irradiating a laser beam, in a first step, a first layer of cladding is formed on a surface of the base metal, and in a second step, a second layer is formed on a cladding starting portion in the first layer in an overlapping manner. In the second step, the processing apparatus is moved to an upper position which is more apart from the base metal than in the first step. In the above manner, since the processing apparatus forms the second layer of cladding with moving the processing apparatus upward, a processing point is moved upward together with motion of the processing apparatus. As a result of this, a generation of a defect in an overlapping portion of the cladding and a neighborhood thereof can be prevented.

9 Claims, 1 Drawing Sheet

CLADDING METHOD BY A LASER BEAM

The content of Application No. TOKUGANHEI 8-191054 in Japan is hereby incorporated by reference.

BACKGROUND OF THE INVENTION

The present invention relates to a cladding method which was a laser beam.

A cladding method for covering a metal base (a base metal) with a metal (a coating material) having a special characteristic by bonding, includes a process of cladding by using a laser beam. In the processing, the laser beam is irradiated onto the base metal and together with this, a levigated coating material is supplied to a irradiation position.

For example, in a valve seat of a cylinder head in an engine for a vehicle, a cladding composed of a copper alloy material having excellent heat abrasion and corrosion resisting characteristics is formed on an aluminum base metal via laser beam irradiation.

SUMMARY OF THE INVENTION

However, in the case of forming a ring like (annular) cladding to the valve seat, if an initial end portion in which the cladding is begun is formed in such a manner as to be disposed adjacent to a terminal end portion thereof, there is a risk that a desired amount of the cladding can not be secured to the initial end portion (the terminal end portion).

In order to avoid the above trouble, it has been proposed that the terminal end portion overlaps the initial end portion. In this case, when a first layer of cladding is formed on a surface of the base metal, it is usual to set a height of the laser beam and a nozzle for supplying a powder with respect to the base metal such that a processing point (a point of intersection between a center line of the laser beam and a center line of the powder supplying nozzle) is positioned substantially on the surface of the metal base. Then, the laser beam and the powder supplying nozzle are moved in such a manner as to keep the set height in the processing point.

However, when the terminal end portion overlaps the initial end portion with setting the height in the processing point to the height in forming a first layer, that a crack tends to be generated.

Accordingly, when the terminal end portion overlaps the initial end portion by moving the laser beam and the powder supplying nozzle substantially in a parallel direction with respect to the surface of the base metal, the processing point is positioned below the first layer which corresponds to a new base metal. Therefore, the processing state is unstable and a deposition state between the first layer and a second layer (in an overlapped portion) is inferior so that there is a high risk that a crack is produced in a stress concentration portion.

The present invention is made so as to solve the above described problems and an object of the present invention is to provide a cladding method by a laser beam capable of effectively preventing generation of a defect in an overlapping portion.

In order to achieve the above described object, in accordance with the present invention, there is provide a cladding method in which a surface of a metal base is coated with a metal for coating by using a processing apparatus for supplying a levigated coating metal together with irradiating a laser beam, wherein the cladding method comprises a first step of forming a first layer of cladding on the surface of the base metal and a second step of forming a second layer on an starting portion of the first layer of cladding in a overlapping manner. In the second step, it is set that the processing apparatus is moved to an upper position which is more apart from the base metal than in the case of the first step.

In accordance with this method, since the processing of cladding is performed in conjunction with the processing apparatus being displaced upward in the second step, a processing point is moved upward together with movement of the processing apparatus. Accordingly, the generation of the crack in an overlapping portion of the cladding and the adjacent portion thereof can be prevented.

Further, it is preferable that a distance of upward displacement of the processing apparatus in the second step is set to not less than 0.8 the thickness of the first layer of cladding and not more than 1.2 the thickness thereof.

In accordance with this method, since the upward displacement distance of the processing apparatus (the processing point) is limited to a preferable range, the generation of the crack particularly in the overlapping portion can be effectively prevented.

Further, in the second step, it is preferable that the processing apparatus starts moving upward after the processing apparatus has passed an initial end of the first layer of cladding by a predetermined distance.

In accordance with this method, since the starting position from which the processing apparatus (the processing point) starts moving upward, is limited, a lack of overlap with the adjacent portion can be effectively prevented.

Further, it is preferable that an angle of inclination θ with respect to the surface of the base metal at a time when the processing apparatus moves upward in the second step is set to an angle larger than 0° and smaller than 80°.

In accordance with this method, since the angle of inclination at a time when the processing apparatus (the processing point) moves upward is limited to a preferable range, the generation of the crack particularly in the overlapping portion can be effectively prevented.

Further, it is preferable that a moving distance of the processing apparatus which overlaps the first layer in the second step, is set to a length not more than five times the distance from the starting portion of the first layer of cladding to the point where the processing apparatus is displaced upwardly.

In accordance with this method, since an overlapping range between the first layer and the second layer is limited to a preferable range, the generation of the crack particularly in the overlapping portion can be effectively prevented.

In this case, in the second step, in place of moving the processing apparatus itself in the upward direction, only the processing point may be moved upward.

DESCRIPTION OF THE PREFERRED EMBODIMENTS

An embodiment of the present invention will be explained with reference to the drawings.

Figure 1:
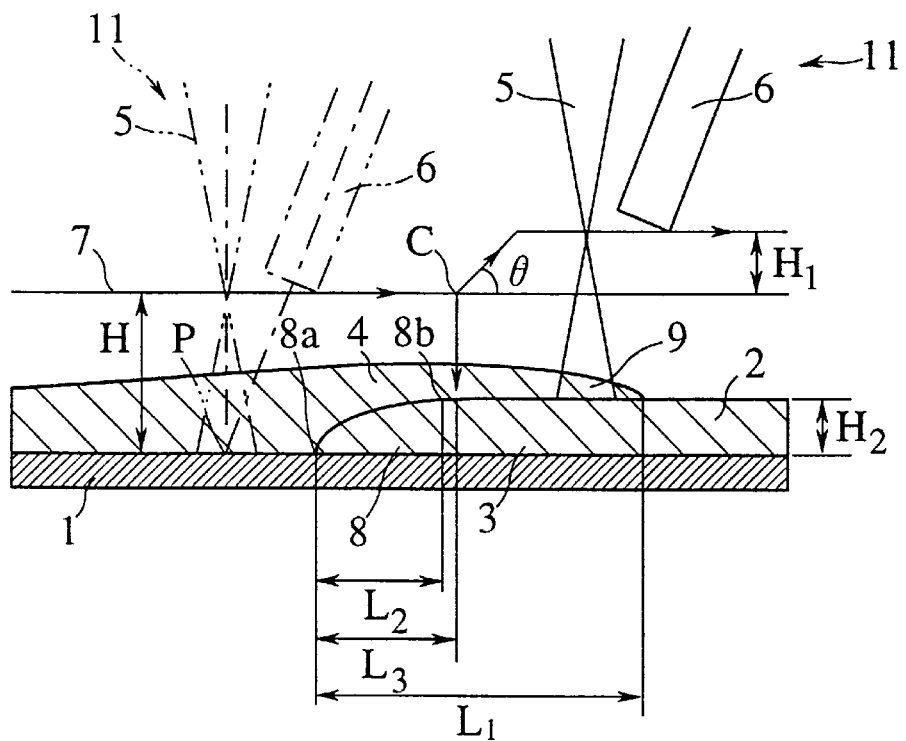
FIG. 1 is a schematic cross sectional view which explains a cladding method by a laser beam in accordance with the present invention.

As shown in FIG. 1, this embodiment relates to a cladding method for covering a surface of a base metal 1 with a metal for coating by using a processing apparatus 11 which supplies a levigated coating metal with irradiation with a laser beam. The processing apparatus 11 comprises a transmitter (not shown) for the laser beam 5 and a powder supplying nozzle 6 which supplies the coating metal from an inclined direction with respect to the laser beam 5.

The base metal 1 corresponds to a valve seat of a cylinder head in an engine for a vehicle and is made of an aluminum alloy material. In contrast of this, the coating metal is a copper alloy material having excellent heat, abrasion and corrosion resisting characteristics.

Figure 2:
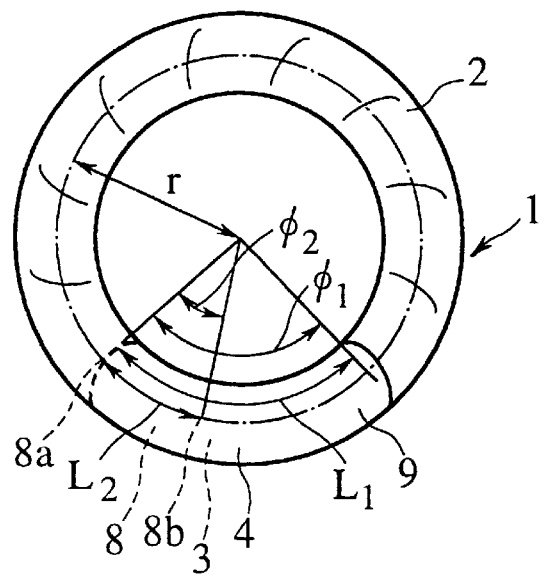
FIG. 2 is a plan view which shows a state in which a cladding is formed on a base metal.

In the case of cladding for covering the surface of the base metal, at first in a first step, a first layer of cladding 2 is formed on the surface of the base metal 1 in a ring shape (refer to FIG. 2). At a time of forming the first layer 2, a height H of the processing apparatus 11 from the base metal 1 is set such that a processing point P which corresponds to a point of intersection between a center line of the laser beam 5 and a center line of the powder supplying nozzle 6 is positioned substantially on the surface of the base metal 1.

Next, in a second step, a second layer of cladding 4 is formed on an initial and portion 3 including a cladding starting portion 8 of the first layer 2 in an overlapping state. The second layer 4 is formed on the first layer 2 in an overlapping state in the above manner because a sufficient amount of cladding is secured between the cladding starting portion 8 and a finishing portion 9 thereof so as to form a complete ring like (viz, annular) cladding. In this case, the cladding starting portion 8 in the first layer 2 corresponds to an area from an initial end 8a of cladding to a stationary position 8b in which a thickness becomes a constant value.

In the second step, the processing apparatus 11 performs a cladding process while being moved along a predetermined track 7 to a position higher than the set height H. Accordingly, the processing point P is moved upward from the surface of the base metal 1. In accordance with this, since the processing point P comes up to the surface of the first layer 3 which corresponds to a base metal for the second layer 4, it is possible to prevent a defect (a crack and a lack of cladding) from being generated at an overlapping portion (between the initial end portion 3 and the second layer 4) or in the neighborhood thereof. In this case, since the upward motion of the processing point P is performed by totally moving the processing apparatus 11 in the upward direction, it is not necessary to change a focus point of the laser beam 5 so that the processing point P can be simply and certainly moved in the upward direction.

In this case, it is preferable to set a distance H1 for moving the processing apparatus 11 upward to a value equal to or more than 80% of a thickness H2 of the cladding in the first layer 2 and equal to or less than 120% thereof (H2×0.8≦H1≦H2×1.2). This is because a case in which a crack is produced in the overlapping portion is recognized in the case that the moving distance H1 is less than the value of 80% of the cladding thickness H2 in the first layer 2 or more than the value of 120% thereof by an experimental result.

In this case, it is preferable that the processing apparatus 11 starts upward moving after the processing apparatus 11 has passed the initial end 8a of the first layer 2. Namely, it is preferable to set a starting portion C, in which the processing apparatus 11 moves upward, to forward from the initial end 8a in a moving direction of the processing apparatus 11. This is because a case in which a lack of cladding is generated in the neighborhood of the cladding starting portion 8 is recognized in the case that the upward motion is started before the initial end 8a of the cladding in the first layer 2.

The reason by which the above phenomenon occurs is considered to be as follows. For example, in the case that the processing point P is moved along the surface of the first layer 2, the cladding is solidified later than motion of the processing point P. Accordingly, when the second layer 4 is formed, since a portion of the first layer 2 positioned just before the second layer 4 is not solidified yet and further the surface of the cladding starting portion 8 is inclined, the coating metal which is fused by the laser beam 5 flows and drops from the second layer 4 to the first layer 2 so that an insufficient amount of the molten metal remains in the second layer 4. On the contrary, since the un-solidified portion of the first layer 2 positioned just before the second layer 4 is steadily drawn to an opposite direction to the moving direction of the processing point P at a time of solidification, a risk of generating the lack of cladding in this portion becomes high. In the case that the lack of cladding is produced, this portion becomes a solidification stress concentration portion and a crack tends to be produced around the portion.

In contrast to this, for example, when the starting position C in which the processing apparatus 11 moves upward, is set to forward from the initial end 8a of the first layer 2 in the moving direction of the processing apparatus 11 and a distance between the starting position C and the initial end 8a is set to a length equal to or more than a length L2 of the cladding starting portion 8, the portion around the cladding starting portion 8 can be solidified before the processing point P Is moved upward. In accordance with this, an amount of the molten metal remaining in the second layer 4 is sufficient and the generation of the lack of the cladding can be prevented. Further, in experiments, the lack of the cladding disappeared.

Further, it is preferable that an inclination angle θ at a time when the processing apparatus 11 is moved upward is set to a range 0°<θ<80° with respect to the surface of the base metal 1. It is because a crack Is generated in the overlapping portion in the case of moving in a vertical direction, by a result of the experimentation.

Still further, it is preferable that an overlapping length (a length of the initial end portion 3) L1 between the first layer 2 and the second layer 4 is set to a length equal to or less than five times the length L2 of the cladding starting portion 8 in the first layer (L2<L1≦5×L2). It is because a crack is generated in a midway of the overlapping portion in the case of providing the overlapping portion having a length more than five times the length L2, as a result of the experimentation. This is because the base metal 1 is diluted due to an excessive heat input. Accordingly, since an intermediate layer existing in an interface between the base metal 1 and a clad portion, for example, an intermetallic compound between a copper and an aluminum (having a very fragile characteristic) is increased when the heat input is excessive with respect to the base metal 1, the clad portion itself becomes fragile so that a crack tends to be generated due to a self-contraction stress.

Next, the contents and results of the experimentation will be concretely explained.

The base metal 1 is a valve seat in a cylinder head made of an aluminum alloy which corresponds to a kind of AC2A in JIS standard (percentage by weight thereof is Cu: 3.5–4.5%, Si:4.0–5.0%, Mg: not more than 0.2%, Zn: not more than 0.5%, Fe: not more than 0.8%, Mn: not more than 0.5%, Ti: not more than 0.2% and Al: the remainder). The coating metal is a copper alloy powder (percentage by weight thereof is Ni: 15.5%, Co: 14.1%, Al: 0.91%, V: 1.58%, Nb: 1.84%, Si: 2.78% and Cu: the remainder).

A diameter r (an average diameter of an inner diameter and an outer diameter) of the base metal 1 is 16 mm and a total peripheral length thereof is about 100 mm.

A processing condition is as follows:

Beam mode: ring mode

Laser output: 4.0 kW

Direction of laser irradiation: normal direction with respect to a bottom surface of a base metal Processing speed: 0.8 m/min Amount of supplying a powder: 40 g/min Angle of a powder supplying nozzle: 70° (with respect to a bottom surface of a base metal)

Mating standoff: 10 mm

Inner diameter of a nozzle: φ3.4 mm

When the first layer 2 is formed on the basis of the above condition, the cladding thickness H2 is about 1.8 mm, the center angle φ2 of the cladding starting portion 8 is about 19° and the length thereof is about 5 mm.

On the basis of this result, with further adding the following processing condition, the second layer 4 is processed:

Moving distance H1 in an upward direction of the processing apparatus 11: 1.8 mm Inclined angle θ of the processing apparatus 11 at a time of moving upward: 4.6°

Center angle φ1 of an overlapping portion: 90° (a length L1: about 25 mm)

Delayed time for processing from the initial end 8*a* to the starting position C of upward moving: about 0.5 second Length L3 from the initial end 8*a* to the starting position C of upward moving: about 6.7 mm When the second layer 4 is formed on the basis of the above condition, a good clad product can be obtained with no crack and no lack of cladding.

A further experimentation is performed by changing the center angle φ2 of the cladding starting portion 8 in a range between about 10° and 25° in accordance with change of the processing condition. In this case, by setting the center angle φ1 of the overlapping portion to a value equal to or lets than five times the center angle φ2, a good clad product can be obtained.

In this case, in the second step, in place of totally moving the processing apparatus 11 in an upward direction, only a processing point P may be moved in an upward direction by changing an inclination of the powder supplying nozzle 6.

What is claimed is:

1. A cladding method for covering a surface of a metal base with a coating metal using a processing apparatus which supplies a levigated coating metal and which irradiates the coating metal with a laser beam, comprising the steps of:

a first step of forming a first layer of cladding on the surface of the metal base; and a second step of forming a second layer on a starting portion of the first layer of cladding in an overlapping manner; wherein:

in said second step, the processing apparatus is moved to a position which is further from the metal base than in said first step, and wherein:

an angle of inclination θ with respect to the surface of the metal base at a time when the processing apparatus moves upward in said second step, is set to an angle larger than 0° and smaller than 80°.

2. A cladding method according to claim 1, wherein:

a distance through which the processing apparatus moves away from the metal base in said second step is set to not less than 0.8 the thickness of the first layer of cladding and not more than 1.2 the thickness thereof.

3. A cladding method according to claim 1, wherein:

a moving distance of the processing apparatus along the first layer in said second step is set to a length not more than five times a distance past the starting portion of the first layer of cladding at which the processing apparatus is moved away from the surface of the metal base.

4. A cladding method for covering a surface of a metal base with a coating metal using a processing apparatus which supplies a levigated coating metal and which irradiates the coating metal with a laser beam, comprising the steps of:

a first step of forming a first layer of cladding on the surface of the metal base; and a second step of forming a second layer on a starting portion of the first layer of cladding in an overlapping manner; wherein:

in said second step, the processing apparatus is moved to a position which is further from the metal base than in said first step, and wherein:

the processing apparatus is moved away from the surface of the metal base after the processing apparatus has passed an initial end of the first layer of cladding.

5. A cladding method for covering a surface of a metal base with a coating metal by moving a processing point which is set by an irradiation of a laser beam and a supply of levigated coating metal, comprising the steps of:

a first step of forming a first layer of cladding on the surface of the metal base; and a second step of forming a second layer on an initial portion of the first layer of cladding in an overlapping manner; wherein in said first step, the processing point is set substantially on the surface of the metal base and in said second step, the processing point is set such that the processing point is moved further away from the metal base than in said first step, and wherein an angle of inclination θ with respect to the surface of the metal base at a time when the processing apparatus moves further away in said second step, is set to an angle larger than 0° and smaller than 80°.

6. A cladding method for cladding a surface of a metal base with a coating metal using an apparatus which supplies powdered coating metal and which irradiates one of metal base and the coating metal with a laser beam from a laser source, the method comprising the steps of:

forming an annular layer of cladding on the surface of the metal base with the apparatus and the source of the laser beam at a predetermined distance from the surface of the metal base, the annular layer having a thickness;

continuing the formation of the annular layer so that it partially overlaps itself and so that the end of the layer is located a predetermined distance past a point where the layer initially starts; and moving the apparatus and the source of the laser beam away from the surface of metal base by a predetermined amount only after a predetermined amount of layer overlap has occurred and before the overlapping layer formation stops.

7. A cladding method according to claim 6, wherein the predetermined amount is not less than 0.8 and not more than 1.2 times the thickness of an un-overlapped portion of the annular layer.

8. A cladding method according to claim 6, wherein the angle of the laser is, at the time the apparatus and the source of the laser beam is moved away from the surface of the metal base, angled with respect to the surface of the metal base at an angle greater than 0° and less than 80°.

9. A cladding method according to claim 6, wherein a total amount of overlap is equal to or less than five times the predetermined amount of overlap.

* * * * *